US006893366B2

(12) United States Patent
Falone et al.

(10) Patent No.: US 6,893,366 B2
(45) Date of Patent: *May 17, 2005

(54) VIBRATION DAMPENING GRIP

(76) Inventors: Thomas Falone, 9 Still Run Dr., Mickelton, NJ (US) 08056; Carmen DiMario, 1851 Huntsman La., West Chester, PA (US) 19382; Robert A. Vito, 1434 Sugartown Rd., Berwyn, PA (US) 19312

( * ) Notice: Subject to any disclaimer, the term of this patent is extended or adjusted under 35 U.S.C. 154(b) by 141 days.

This patent is subject to a terminal disclaimer.

(21) Appl. No.: 10/659,674

(22) Filed: Sep. 10, 2003

(65) Prior Publication Data

US 2004/0048701 A1 Mar. 11, 2004

Related U.S. Application Data

(62) Division of application No. 09/939,319, filed on Aug. 27, 2001, now Pat. No. 6,652,398.

(51) Int. Cl.$^7$ .............................. A63D 59/06; B25G 1/01
(52) U.S. Cl. ..................... 473/568; 81/489; 473/300
(58) Field of Search ................................ 473/564–568, 473/519, 520, 300, 303, 457, 544–551; 442/250, 260, 164, 169; 81/489

(56) References Cited

U.S. PATENT DOCUMENTS

| | | |
|---|---|---|
| 1,125,029 A | 1/1915 | Lard |
| 1,195,994 A | 8/1916 | Lard |
| 1,498,838 A | 6/1924 | Harrison, Jr. |
| 1,551,203 A | 8/1925 | Mills |
| 1,620,118 A | 3/1927 | Mattern |
| 1,701,856 A | 2/1929 | Kraeuter |
| 2,023,131 A | 12/1935 | Gibson |
| 2,099,521 A | 11/1937 | Herkimer et al. |
| 2,871,899 A | 2/1959 | Coyle et al. |
| 3,353,981 A | 11/1967 | Jacob |
| 3,606,326 A | 9/1971 | Sparks et al. |
| 3,716,433 A | 2/1973 | Plummer |
| 3,779,551 A | 12/1973 | Wilson |
| 4,015,851 A | 4/1977 | Pennell |
| 4,044,625 A | 8/1977 | D'Haem et al. |
| 4,134,198 A | 1/1979 | Briggs |
| 4,143,109 A | 3/1979 | Stockum |
| 4,147,443 A | 4/1979 | Skobel |
| 4,197,611 A | 4/1980 | Bell et al. |
| 4,261,567 A | 4/1981 | Uffindell |
| 4,268,574 A | 5/1981 | Peccenini et al. |
| 4,338,270 A | 7/1982 | Uffindell |
| 4,347,280 A | 8/1982 | Lau et al. |
| 4,417,042 A | 11/1983 | Dziark |
| 4,483,972 A | 11/1984 | Mitchell |
| 4,552,713 A | 11/1985 | Cavicchioli |
| 4,591,160 A | 5/1986 | Piragino |
| 4,597,578 A | 7/1986 | Lancaster |
| 4,613,537 A | 9/1986 | Krupper |
| 4,660,832 A | 4/1987 | Shomo |
| 4,736,949 A | 4/1988 | Muroi |
| 4,819,939 A | 4/1989 | Kobayashi |
| 4,864,738 A | 9/1989 | Horovitz |

(Continued)

FOREIGN PATENT DOCUMENTS

| DE | 2805314 | 8/1979 |
|---|---|---|
| GB | 458367 | 6/1935 |

*Primary Examiner*—Mark S. Graham
(74) *Attorney, Agent, or Firm*—Volpe and Koenig, P.C.

(57) ABSTRACT

A vibration absorbing grip including a grip body formed by a multi-layer material. The material preferably includes a first elastomeric layer of vibration absorbing material which is substantially free of voids therein. A second elastomeric layer which includes an aramid material therein and is disposed on the first elastomeric layer. The amramid material distributes vibration to facilitate vibration dampening. A third elastomeric layer is disposed on the second elastomeric layer and is adapted to be gripped by a user.

7 Claims, 3 Drawing Sheets

U.S. PATENT DOCUMENTS

| | | | |
|---|---|---|---|
| 4,912,836 A | 4/1990 | Avetoom | |
| 4,919,420 A | 4/1990 | Sato | |
| 4,948,131 A | 8/1990 | Nakanishi | |
| 4,953,862 A | 9/1990 | Uke et al. | |
| 4,983,242 A | 1/1991 | Reed | |
| 5,005,254 A | 4/1991 | Uffindell | |
| 5,042,804 A | 8/1991 | Uke et al. | |
| 5,083,780 A | 1/1992 | Walton et al. | |
| 5,088,734 A | 2/1992 | Glava | |
| 5,110,653 A | 5/1992 | Landi | |
| 5,122,405 A | 6/1992 | Landi | |
| 5,137,769 A | 8/1992 | Landi | |
| 5,193,246 A | 3/1993 | Huang | |
| 5,199,706 A | 4/1993 | Chen | |
| 5,203,561 A | 4/1993 | Lanctot | |
| 5,240,247 A | 8/1993 | Didier | |
| 5,254,391 A | 10/1993 | Davis | |
| 5,258,088 A | 11/1993 | Wu | |
| 5,261,665 A | 11/1993 | Downey | |
| 5,267,487 A | 12/1993 | Falco et al. | |
| 5,269,516 A | 12/1993 | Janes | |
| 5,282,618 A | 2/1994 | Hong | |
| 5,290,036 A | 3/1994 | Fenton et al. | |
| 5,294,119 A | 3/1994 | Vincent et al. | |
| 5,322,280 A | 6/1994 | Wu | |
| 5,322,285 A | 6/1994 | Turner | |
| 5,322,290 A | 6/1994 | Minami | |
| 5,333,861 A | 8/1994 | Mills | |
| 5,338,600 A | 8/1994 | Fitchmun et al. | |
| 5,348,303 A | 9/1994 | Swissheim | |
| 5,355,552 A | 10/1994 | Huang | |
| 5,362,046 A | 11/1994 | Sims | |
| 5,377,979 A | 1/1995 | Long | |
| 5,384,083 A * | 1/1995 | Dawn et al. | 264/130 |
| 5,395,108 A | 3/1995 | Souders et al. | |
| 5,435,549 A | 7/1995 | Chen | |
| 5,463,824 A * | 11/1995 | Barna | 36/44 |
| 5,511,777 A | 4/1996 | McNeely | |
| 5,516,101 A | 5/1996 | Peng | |
| 5,524,885 A | 6/1996 | Heo | |
| 5,528,842 A | 6/1996 | Ricci et al. | |
| 5,547,189 A | 8/1996 | Billings | |
| 5,575,473 A | 11/1996 | Turner | |
| 5,593,158 A | 1/1997 | Filice et al. | |
| 5,621,914 A | 4/1997 | Ramone et al. | |
| 5,624,114 A | 4/1997 | Kelsey | |
| D379,208 S | 5/1997 | Kulisek, Jr. | |
| 5,636,377 A | 6/1997 | Wiener | |
| 5,653,643 A | 8/1997 | Falone et al. | |
| 5,655,975 A | 8/1997 | Nashif | |
| 5,657,985 A | 8/1997 | Dahlstrom et al. | |
| 5,673,437 A | 10/1997 | Chase et al. | |
| 5,686,158 A | 11/1997 | Gibbon | |
| 5,695,408 A | 12/1997 | DeLaCruz | |
| 5,730,662 A | 3/1998 | Rens | |
| 5,749,798 A | 5/1998 | Kuebler et al. | |
| 5,759,113 A | 6/1998 | Lai et al. | |
| 5,772,524 A | 6/1998 | Huang | |
| 5,789,327 A * | 8/1998 | Rousseau | 442/135 |
| 5,840,397 A | 11/1998 | Landi et al. | |
| 5,842,933 A | 12/1998 | Lewis | |
| 5,858,521 A | 1/1999 | Okuda et al. | |
| 5,912,195 A * | 6/1999 | Walla et al. | 442/136 |
| 5,916,664 A | 6/1999 | Rudy | |
| 5,926,847 A | 7/1999 | Eibert | |
| 5,944,617 A | 8/1999 | Falone et al. | |
| 5,946,734 A | 9/1999 | Vogan | |
| 5,963,989 A | 10/1999 | Robertson | |
| 5,979,081 A * | 11/1999 | Vaz | 36/107 |
| 6,000,062 A | 12/1999 | Trakh | |
| 6,007,439 A | 12/1999 | MacKay, Jr. | |
| 6,077,793 A * | 6/2000 | Hatjasalo et al. | 442/65 |
| 6,216,276 B1 | 4/2001 | Eibert | |
| 6,219,940 B1 | 4/2001 | Kita | |
| 6,231,946 B1 * | 5/2001 | Brown et al. | 428/108 |
| 6,368,989 B1 | 4/2002 | Pascual et al. | |
| 6,416,432 B1 | 7/2002 | Rosen et al. | |
| 6,558,270 B2 * | 5/2003 | Kwitek | 473/301 |
| 6,652,398 B2 * | 11/2003 | Falone et al. | 473/568 |
| 2001/0008053 A1 | 7/2001 | Belli | |
| 2001/0055994 A1 | 12/2001 | Kwitek | |

* cited by examiner

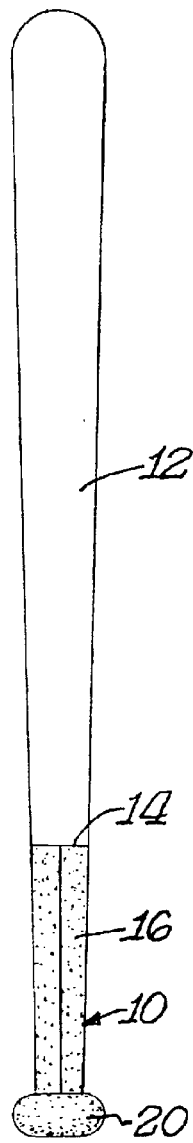
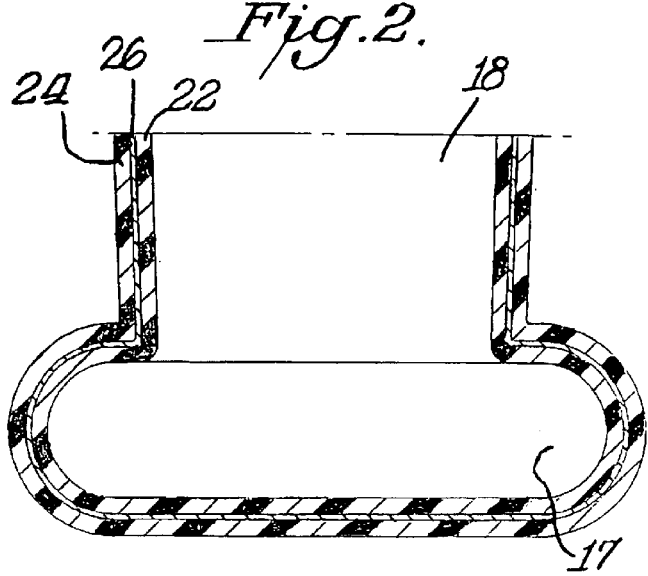
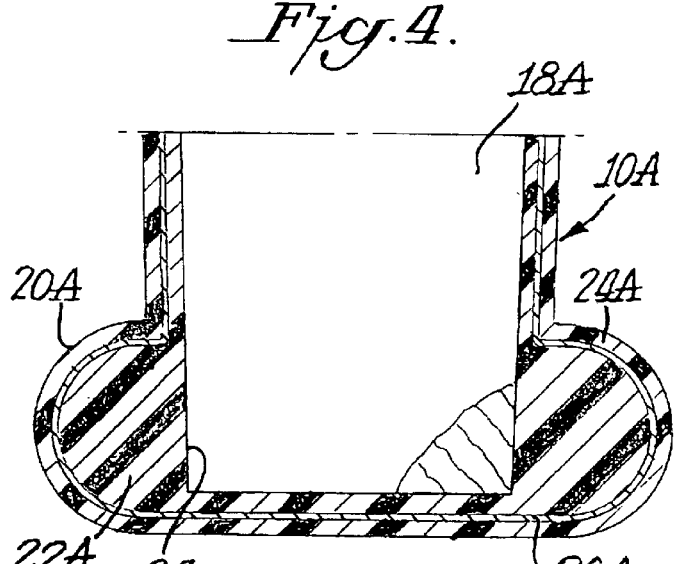
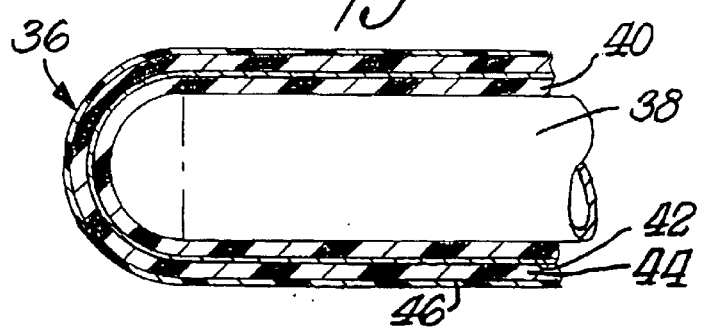

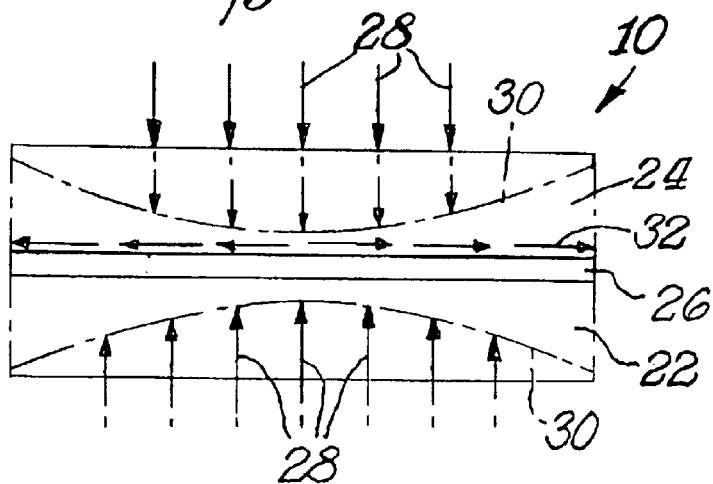
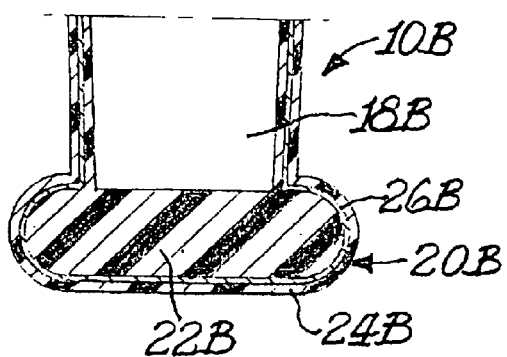
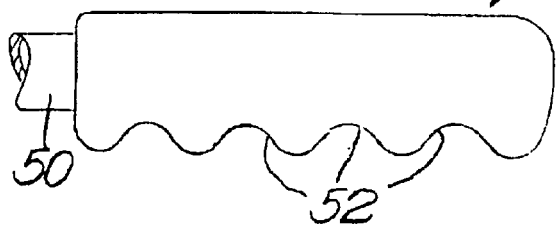
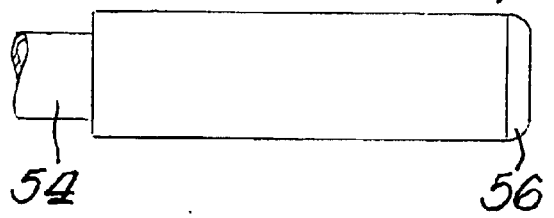

VIBRATION DAMPENING GRIP

CROSS REFERENCE TO RELATED APPLICATION

This application is a divisional of and claims priority to U.S. patent application Ser. No. 09/939,319, filed on Aug. 27, 2001, now U.S. Pat. No. 6,652,398, which is hereby incorporated by reference herein as if fully set forth in its entirety.

BACKGROUND OF THE INVENTION

U.S. Pat. Nos. 5,653,643 and 5,944,617 disclose vibration absorbing material which is particularly useful when applied to the gripping area of the handle of some type of implement such as a golf club or various types of other athletic equipment or tools. The material described in those patents is of single layer form having certain characteristics with regard to its friction, vibration dampening and hardness features. It would be desirable if variations could be provided for such material which would enhance the characteristics of the material without significantly resulting in a material which is of impractical thickness. Ideally, such material should provide a sting free grip which could be readily adapted to the handle of various types of implements such as athletic equipment, tools and handlebars.

SUMMARY OF THE INVENTION

An object of this invention is to provide a variation of the techniques described in U.S. Pat. Nos. 5,653,643 and 5,944,617.

In accordance with one practice of this invention a molded sleeve includes sleeve is utilized for fitting over the handle of an implement. The sleeve is open at one end to facilitate the sleeve fitting around the handle. The other end of the outwardly extending peripheral knob which acts as a stop to minimize any tendency of the user's hand to slip from the handle. By making the knob of vibration dampening material, the knob also cooperates in achieving a sting free grip. The sleeve itself could be made of single layer form from the type of material shown and described in U.S. Pat. Nos. 5,653,643 and 5,944,617. Alternatively, the sleeve could be a multilayer laminate having an inner layer of such type of material of the aforenoted patents and an outer layer of tacky material which could be the same as or different from the inner layer.

In a preferred practice of the invention there is at least one intermediate layer which is preferably made of a force dissipating or stiffening material such as aramid fibers.

The invention may also be practiced where the sleeve or cover does not necessarily include a knob and wherein the cover is a multilayer laminate as described above.

BRIEF DESCRIPTION OF THE DRAWINGS

FIG. 1 is an elevational view of a baseball bat having a cover in the form of a sleeve on the handle area in accordance with this invention;

FIG. 2 is an enlarged fragmental cross-sectional view of the bat and sleeve shown in FIG. 1;

FIG. 3 is a schematic diagram showing the results in the application of shock forces on a cover in accordance with this invention;

FIG. 4 is a view similar to FIG. 2 showing an alternative sleeve mounted on a different implement;

FIG. 5 is a view similar to FIGS. 2 and 4 showing still yet another form of sleeve in accordance with this invention;

FIG. 6 is a cross-sectional longitudinal view showing an alternative cover in accordance with this invention mounted on a further type of implement;

FIG. 6 is a cross-sectional longitudinal view showing an alternative cover in accordance with this invention mounted on a further type of implement;

FIG. 9 is an elevational view showing a portion of a handlebar incorporating a vibration dampening cover in accordance with this invention;

FIG. 9 is an elevational view showing a portion of a handlebar incorporating a vibration dampening cover in accordance with this invention;

FIG. 10 is a view similar to FIG. 9 of yet another practice of this invention; and FIGS. 9–14 are plan views of various forms of the intermediate force dissipating layer which is used in certain practices of this invention.

DETAILED DESCRIPTION OF THE PREFERRED EMBODIMENTS

Figure 7:
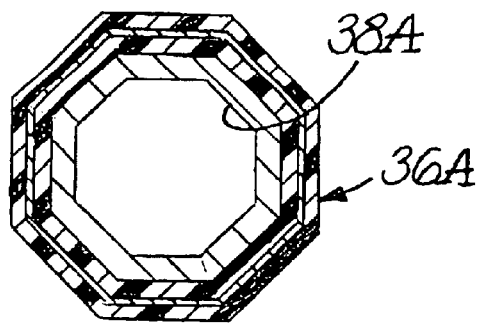
FIG. 7 is a cross-sectional end view of yet another cover in accordance with this invention.

The present invention is directed to a cover for the handle of an implement. The cover is made of a vibration dampening or vibration absorbing material which may include as one layer the type of material disclosed in U.S. Pat. Nos. 5,653,643 and 5,944,617. All of the details of those patents are fully incorporated herein not only with regard to the materials, but also with regard to the devices to which the material may be applied, as well as other disclosures in those patents.

FIGS. 1–2 illustrate one practice of this invention. As shown therein a cover in the form of a sleeve 10 is mounted on the handle or lower portion 18 of a baseball bat 10. Sleeve 10 is premolded so that it can be fit onto the handle portion of the bat 12 in a quick and convenient manner. This can be accomplished by having the sleeve 10 made of a stretchable or resilient material so that its upper end 14 would be pulled open and could be stretched to fit over the knob 17 of the bat 12. Alternatively, or in addition, sleeve 10 may be provided with a longitudinal slit 16 to permit the sleeve to be pulled at least partially open and thereby facilitate snapping the sleeve 10 over the handle 18 of the bat 12. The sleeve would remain mounted in place due to the tacky nature of the sleeve material and/or by the application of a suitable adhesive on the inner surface of the sleeve and/or on the outer surface of handle 18.

A characterizing feature of sleeve 10, as illustrated in FIGS. 1–2, is that the lower end of the sleeve includes an outwardly extending peripheral knob 20. Knob 20 could be a separate cap snapped onto or secured in any other manner to the main portion of sleeve 10. Alternatively, knob 20 could be integral with and molded as part of the sleeve 10.

In a broad practice of this invention, sleeve 10 is of a single layer made from the type of material described in U.S. Pat. Nos. 5,653,643 and 5,944,617. Such material is a vibration dampening material, an example being a silicone gel such as used for caulking purposes. The material would have the appropriate hardness and vibration dampening characteristics. The outer surface of the material would be tacky having high friction characteristics.

Alternatively, the sleeve 10 could be formed from a two layer laminate where the vibration absorbing material forms the inner layer disposed against the handle, with a separate tacky outer layer made from any suitable high friction material such as a thermoplastic material with polyurethane being one example. Thus, the two layer laminate would have an inner elastomer layer which is characterized by its vibration dampening ability, while the main characteristic of the outer elastomer layer is its tackiness to provide a suitable gripping surface that would resist the tendency for the user's hand to slide off the handle. The provision of the knob 20 also functions both as a stop member to minimize the tendency for the handle to slip from the user's hand and to cooperate in the vibration dampening affect.

FIG. 2 illustrates the preferred form of multilayer laminate which includes the inner vibration absorbing layer 22 and the outer tacky gripping layer 24 with an intermediate layer 26 made of a stiffening material which dissipates force. If desired layer 26 could be innermost and layer 24 could be the intermediate layer. A preferred stiffening material would be aramid fibers which could be incorporated in the material in any suitable manner as later described with respect to FIGS. 11–14.

FIG. 3 schematically shows what is believed to be the affect of the shock forces from vibration when the implement makes contact such as from the bat 12 striking a ball. FIG. 3 shows the force vectors in accordance with a three layer laminate, such as illustrated in FIG. 2, wherein elastomeric layers 22,24 are made of a silicone material of the type described in U.S. Pat. Nos. 5,653,643 and 6,944,617. The intermediate layer 26 is an aramid layer made of Kevlar® fibers. The initial shock or vibration is shown by the lateral or transverse arrows 28 on each side of the sleeve laminate 10. This causes the elastomeric layers 22,24 to be compressed along the arc 30. The inclusion of the intermediate layer 26 made from a force dissipating material spreads the vibration longitudinally as shown by the arrows 32. The linear spread of the vibration causes a rebound effect which totally dampens the vibration.

Laboratory tests were carried out at a prominent university to evaluate various grips mounted on baseball bats. In the testing, baseball bats with various grips were suspended from the ceiling by a thin thread; this achieves almost a free boundary condition that is needed to determine the true characteristics of the bats. Two standard industrial accelerometers were mounted on a specially fabricated sleeve roughly in positions where the left hand and the right hand would grip the bat. A known force was delivered to the bat with a standard calibrated impact hammer at three positions, one corresponding to the sweet spot, the other two simulating "miss hits" located on the mid-point and shaft of the bat. The time history of the force as well as the accelerations were routed through a signal conditioning device and were connected to a data acquisition device. This was connected to a computer which was used to log the data.

Two series of tests were conducted. In the first test, a control bat (with a standard rubber grip, WORTH Bat—model #C405) was compared to identical bats with several "Sting-Free" grips representing practices of the invention. These "Sting-Free" grips were comprised of two layers of pure silicone with various types of Kevlar° inserted between the two layers of silicone. The types of Kevlar° used in this test were referenced as follows: "005", "645", "120", "909". Also, a bat with just a thick layer of silicone but no Kevlar° was tested. With the exception of the thick silicone (which was deemed impractical because of the excessive thickness), the "645" bat showed the best reduction in vibration magnitudes.

The second series of tests were conducted using EASTON Bats (model #BK8) with the "645" Kevlar° in different combinations with silicone layers: The first bat tested was comprised of one bottom layer of silicone with a middle layer of the "645" Kevlar© and one top layer of silicone referred to as "111". The second bat test was comprised of two bottom layers of silicone with a middle layer of Kevlar° and one top layer of silicone referred to as "211". The third bat tested was comprised of one bottom layer of silicone with a middle layer of Kevlar© and two top layers of silicone referred to as "112". The "645" bat with the "111" configuration showed the best reduction in vibration magnitudes.

In order to quantify the effect of this vibration reduction, two criteria were defined: (I) the time it takes for the vibration to dissipate to an imperceptible value; and, (2) the magnitude of vibration in the range of frequencies at which the human hand is most sensitive.

The sting-free grips reduced the vibration in the baseball bats by both quantitative measures. In particular, the "645" Kevlar° in a "111" configuration was the best in vibration reduction. In the case of a baseball bat, the "645" reduced the bat's vibration in about ⅕ the time it took the control rubber grip to do so. The reduction in peak magnitude of vibration ranged from 60% to 80%, depending on the impact location and magnitude.

It was concluded that the "645" Kevlar° grip in a "111" combination reduces the magnitude of sensible vibration by 80% that is induced in a baseball bat when a player hits a ball with it. This was found to be true for a variety of impacts at different locations along the length of the bat. Hence, a person using the "Sting-Free" grips of the invention would clearly experience a considerable reduction in the sting effect (pain) when using the "Sting-free" grip than one would with a standard grip.

In view of the above tests a particularly preferred practice of the invention involves a multilayer laminate having an aramid such as Kevlar®, sandwiched between layers of pure silicone. The above indicated tests show dramatic results with this embodiment of the invention. As also indicated above, however, the laminate could comprise other combinations of layers such as a plurality of bottom layers of silicone or a plurality of top layers of silicone. other variations include a repetitive laminate assembly wherein a vibration dampening layer is innermost with a force dissipating layer against the lower vibration dampening layer and then with a second vibration dampening layer over the force dissipating layer followed by a second force dissipating layer, etc. with the final laminate layer being a gripping layer which could also be made of vibration dampening material. Among the considerations in determining which laminate should be used would be the thickness limitations and the desired vibration dampening properties.

The various layers could have different relative thicknesses. Preferably, the vibration dampening layer, such as layer 22, would be the thickest of the layers. The outermost gripping layer, however, could be of the same thickness as the vibration dampening layer, such as layer 24 shown in FIG. 2 or could be a thinner layer since the main function of the outer layer is to provide sufficient friction to assure a firm gripping action. A particularly advantageous feature of the invention where a force dissipating stiffening layer is used is that the force dissipating layer could be very thin and still achieve its intended results. Thus, the force dissipating layer would preferably be the thinnest of the layers, although it might be of generally the same thickness as the outer gripping layer. If desired the laminate could also include a plurality of vibration dampening layers (such as thin layers of gel material) and/or a plurality of stiffening force dissipating layers. Where such plural layers are used, the various layers could differ in the thickness from each other.

FIGS. 1–2 show the use of the invention where the sleeve 10 is mounted over a baseball bat 12 having a knob 17. The same general type structure could also be used where the implement does not have a knob similar to a baseball bat knob. FIG. 4, for example, illustrates a variation of the invention wherein the sleeve 10A would be mounted on the handle 18A of an implement that does not terminate in any knob. Such implement could be various types of athletic equipment, tools, etc. The sleeve 10A, however, would still have a knob 20A which would include an outer gripping layer 24A, an intermediate force dissipating layer 26A, and an inner vibration dampening layer 22A. In the embodiment shown in FIG. 4, the handle 18A extends into the knob 20A. Thus, the inner layer 22A would have an accommodating recess 34 for receiving the handle 18A. The inner layer 22A would also be of greater thickness in the knob area as illustrated.

FIG. 5 shows a variation where the sleeve 10B fits over handle 18B without the handle 18B penetrating the knob 20B. As illustrated, the outer gripping layer 24B would be of uniform thickness both in the gripping area and in the knob. Similarly, the intermediate force dissipating layer 26B would also be of uniform thickness. The inner shock absorbing layer 22B, however, would completely occupy the portion of the knob inwardly of the force dissipating layer 26B since the handle 18B terminates short of the knob 20B.

Figure 8:
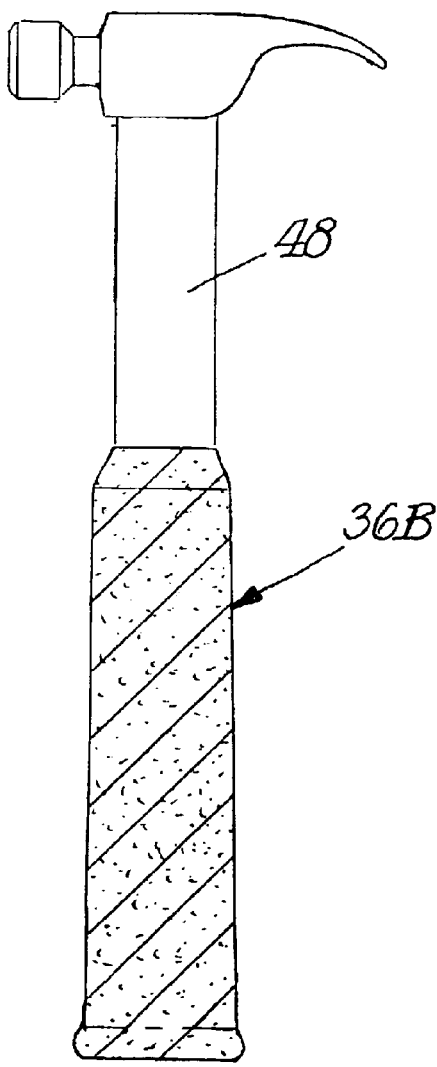
FIG. 8 is an elevational view of a hammer incorporating an abrasive dampening handle in accordance with this invention.

FIG. 6 shows a variation of the invention where the gripping cover 36 does not include a knob. As shown therein, the gripping cover would be mounted over the gripping area of a handle 38 in any suitable manner and would be held in place either by a previously applied adhesive or due to the tacky nature of the innermost vibration dampening layer 40 or due to resilient characteristics of the cover 36. Additionally, the cover might be formed directly on the handle 38. FIG. 8, for example, shows a cover 36B which is applied in the form of tape.

As shown in FIG. 6 the cover 36 includes one of the laminate variations where a force dissipating layer 42 is provided over the inner vibration dampening layer 40 with a second vibration dampening layer 44 applied over force dissipating layer 42 and with a final thin gripping layer 46 as the outermost layer. As illustrated, the two vibration dampening layers 40 and 44 are the thickest layers and may be of the same or differing thickness from each other. The force dissipating layer 42 and outer gripping layer 44 are significantly thinner.

FIG. 7 shows a cover 36A mounted over a hollow handle 38A which is of non-circular cross-section. Handle 38A may, for example, have the octagonal shape of a tennis racquet.

FIG. 8 shows a further cover 36B mounted over the handle portion of tool such as hammer 48. As illustrated, the cover 36B is applied in tape form and would conform to the shape of the handle portion of hammer 48. Other forms of covers could also be applied rather than using a tape. Similarly, the tape could be used as a means for applying a cover to other types of implements.

FIG. 9 illustrates a cover 36C mounted over the end of a handlebar, such as the handlebar of various types of cycles or any other device having a handlebar including steering wheels for vehicles and the like. FIG. 9 also illustrates a variation where the cover 36C has an outer contour with finger receiving recesses 52. Such recesses could also be utilized for covers of other types of implements.

FIG. 10 illustrates a variation of the invention where the cover 36D is mounted to the handle portion of an implement 54 with the extreme end 56 of the implement being bare. This illustration is to show that the invention is intended to provide a vibration dampening gripping cover for the handle of an implement and that the cover need not extend beyond the gripping area. Thus, there could be portions of the implement on both ends of the handle without having the cover applied to those portions.

In a preferred practice of the invention, as previously discussed, a force dissipating stiffening layer is provided as an intermediate layer of a multilayer laminate where there is at least one inner layer of vibration dampening material and an outer layer of gripping material with the possibility of additional layers of vibration dampening material and force dissipating layers of various thickness. As noted the force dissipating layer could be innermost. The invention may also be practiced where the laminate includes one or more layers in addition to the gripping layer and the stiffening layer and the vibration dampening layer. Such additional layer(s) could be incorporated at any location in the laminate, depending on its intended function (e.g., an adhesive layer, a cushioning layer, etc.).

Figure 11:
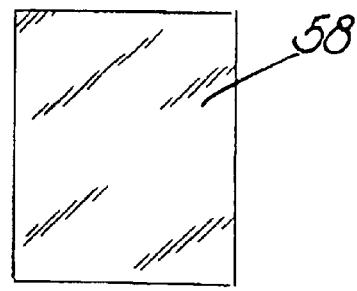
Figure 12:
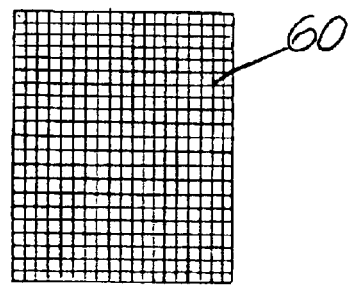
Figure 13:
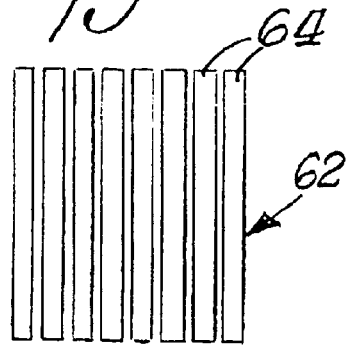
Figure 14:
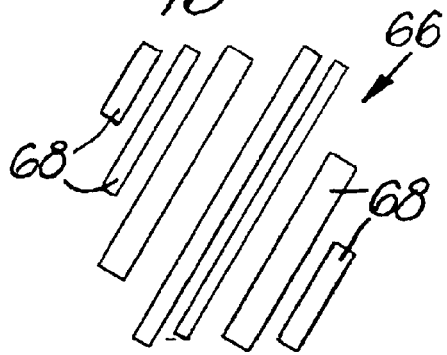

The force dissipating layer could be incorporated in the laminate in various manners. FIG. 11, for example, illustrates a force dissipating stiffening layer 58 in the form of a generally imperforate sheet. FIG. 12 illustrates a force dissipating layer 60 in the form of an open mesh sheet. This is a particularly advantageous manner of forming the force dissipating layer where it is made of Kevlar® fibers. FIG. 13 illustrates a variation where the force dissipating layer 62 is formed from a plurality of individual strips of material 64 which are parallel to each other and generally identical to each other in length and thickness as well as spacing. FIG. 14 shows a variation where the force dissipating layer 66 is made of individual strips 68 of different sizes and which could be disposed in a more random fashion regarding their orientation. Although all of the strips 68 are illustrated in FIG. 14 as being parallel, non-parallel arrangements could also be used.

The vibration dampening grip cover of this invention could be used for a wide number of implements. Examples of such implements include athletic equipment, hand tools and handlebars. For example, such athletic equipment includes bats, racquets, sticks, javelins, etc. Examples of tools include hammers, screwdrivers, shovels, rakes, brooms, wrenches, pliers, knives, handguns, air hammers, etc. Examples of handlebars include motorcycles, bicycles and various types of steering wheels.

A preferred practice of this invention is to incorporate a force dissipating layer, particularly an aramid, such as Kevlar® fiber, into a composite with at least two elastomers. One elastomer layer would function as a vibration dampening material and the other outer elastomer layer which would function as a gripping layer. The outer elastomer layer could also be a vibration dampening material. Preferably, the outer layer completely covers the composite.

There are an almost infinite number of possible uses for the composite of laminate of this invention. In accordance with the various uses the elastomer layers may have different degrees of hardness, coefficient of friction and dampening of vibration. Similarly, the thicknesses of the various layers could also vary in accordance with the intended use. Examples of ranges of hardness for the inner vibration dampening layer and the outer gripping layer (which may also be a vibration absorbing layer) are 5–70 Durometer Shore A. One of the layers may have a range of 5–20 Durometer Shore A and the other a range of 30–70 Durometer Shore A for either of these layers. The vibration dampening layer could have a hardness of less than 5, and could even be a 000 Durometer reading. The vibration dampening material could be a gel, such as a silicone gel or a gel of any other suitable material. The coefficient of friction as determined by conventional measuring techniques for the tacky and non-porous gripping layer is preferably at least 0.5 and may be in the range of 0.6–1.5. A more preferred range is 0.7–1.2 with a still more preferred range being about 0.8–1. The outer gripping layer, when also used as a vibration dampening layer, could have the same thickness as the inner layer. When used solely as a gripping layer the thickness could be generally the same as the intermediate layer, which might be about 1/20 to 1/4 of the thickness of the vibration dampening layer.

The grip cover of this invention could be used with various implements as discussed above. Thus, the handle portion of the implement could be of cylindrical shape with a uniform diameter and smooth outer surface such as the golf club handle 38 shown in FIG. 4. Alternatively, the handle could taper such as the bat handle shown in FIGS. 1–2. Other illustrated geometric shapes include the octagonal tennis racquet handle 38A shown in FIG. 7 or a generally oval type handle such as the hammer 48 shown in FIG. 8. The invention is not limited to any particular geometric shape. In addition, the implement could have an irregular shape such as a handle bar with finger receiving depressions as shown in FIG. 9. Where the outer surface of the implement handle is of non-smooth configuration the inner layer of the cover could press against and generally conform to the outer surface of the handle and the outermost gripping layer of the cover could include its own finger receiving depressions. Alternatively, the cover may be of uniform thickness of a shape conforming to the irregularities in the outer surface of the handle.

Other variations and uses will be readily apparent to those of ordinary skill in the art in view of the above teachings, examples and suggestions.

What is claimed is:

1. A vibration absorbing grip, comprising:
   a grip body formed by a multi-layer material comprising:
   a first elastomeric layer of vibration absorbing material which is substantially free of voids therein;
   a second elastomeric layer which includes an aramid material therein and that is disposed on the first elastomeric layer, wherein the amramid material distributes vibration to facilitate vibration dampening, wherein the aramid material forms an imperforate sheet disposed within the second elastomeric layer; and
   a third elastomeric layer disposed on the second elastomeric layer and adapted to be gripped by a user.

2. A vibration absorbing grip, comprising:
   a grip body formed by a multi-layer material comprising:
   a first elastomeric layer of vibration absorbing material which is substantially free of voids therein;
   a second elastomeric layer which includes an aramid material therein and that is disposed on the first elastomeric layer, wherein the amramid material distributes vibration to facilitate vibration dampening, wherein the aramid material forms an imperforate sheet disposed within the second elastomeric layer wherein the aramid material forms a plurality of individual strips that are substantially parallel to each other; and
   a third elastomeric layer disposed on the second elastomeric layer and adapted to be gripped by a user.

3. The grip of claim 2, wherein the plurality of individual strips are generally equally sized.

4. A vibration absorbing grip, comprising:
   a grip body formed by a multi-layer material comprising:
   a first elastomeric layer of vibration absorbing material which is substantially free of voids therein:
   a second elastomeric layer which includes an aramid material therein and that is disposed on the first elastomeric layer, wherein the amramid material distributes vibration to facilitate vibration dampening, wherein the aramid material forms a plurality of individual strips of different sizes that are substantially parallel to each other; and
   a third elastomeric layer disposed on the second elastomeric layer and adapted to be gripped by a user.

5. A vibration absorbing grip, comprising:
   a sleeve having an end defining an opening, wherein the sleeve is adapted to absorb vibration and comprises:
   a first elastomeric layer adapted to absorb vibration, the first elastomeric layer being substantially free of voids therein;
   a second elastomeric layer which includes an aramid material therein and that is disposed on the first elastomeric layer, the aramid material comprising a plurality of individual strips of aramid of different sizes, wherein the amramid material distributes vibration to facilitate vibration dampening, the second elastomeric layer being substantially free of voids therein;
   a third elastomeric layer that is disposed on the second elastomeric layer, the third elastomeric layer being substantially free of voids.

6. The grip of claim 5, wherein the second and third elastomeric layers are generally of equal thickness.

7. A vibration absorbing grip, comprising:
   a sleeve having upper and lower ends, the upper end defining an opening to permit a portion of a grip supporting object to extend therethrough, wherein the sleeve is adapted to absorb vibration and comprises:
   an first layer adapted to absorb vibration and being formed by an elastomer that is substantially free of voids therein;
   a second layer which includes an aramid material therein and that is disposed on the first layer, the aramid material comprising a plurality of individual strips of aramid of generally equal sizes, wherein the amramid material distributes vibration to facilitate vibration dampening, the second layer being substantially free of voids therein, the plurality of individual aramid strips being generally parallel to each other; and
   a third layer formed by an elastomer that is substantially free of voids.

* * * * *